March 30, 1954   A. R. MEYER   2,673,916
WELDING PROCESS AND APPARATUS

Filed May 11, 1953   5 Sheets-Sheet 1

March 30, 1954  A. R. MEYER  2,673,916
WELDING PROCESS AND APPARATUS
Filed May 11, 1953  5 Sheets-Sheet 2
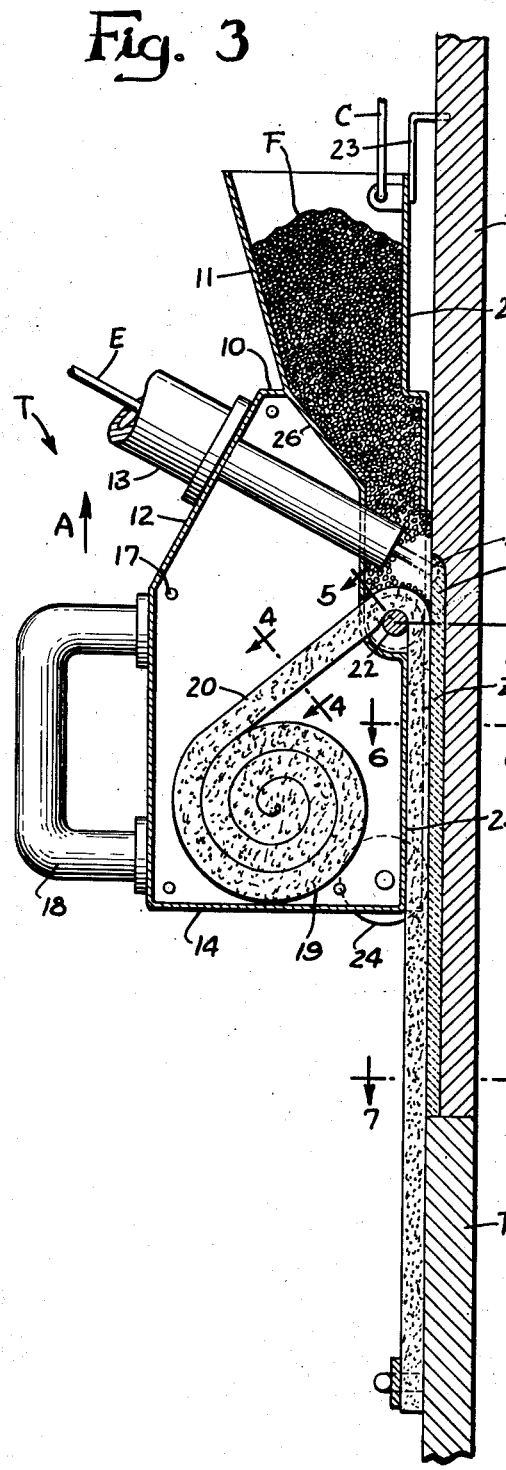
Fig. 3
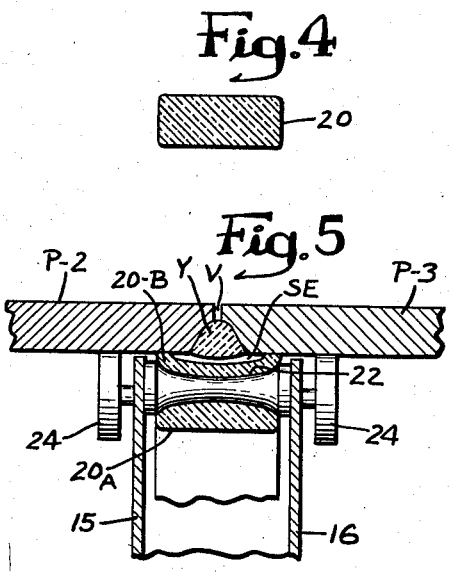
Fig. 4
Fig. 5
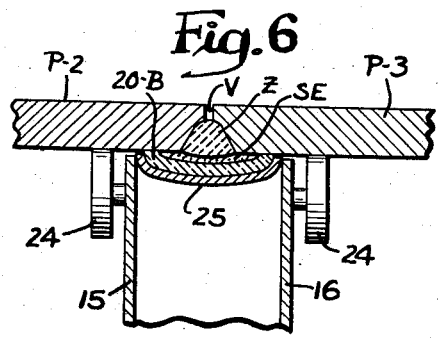
Fig. 6
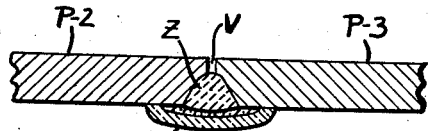
Fig. 7

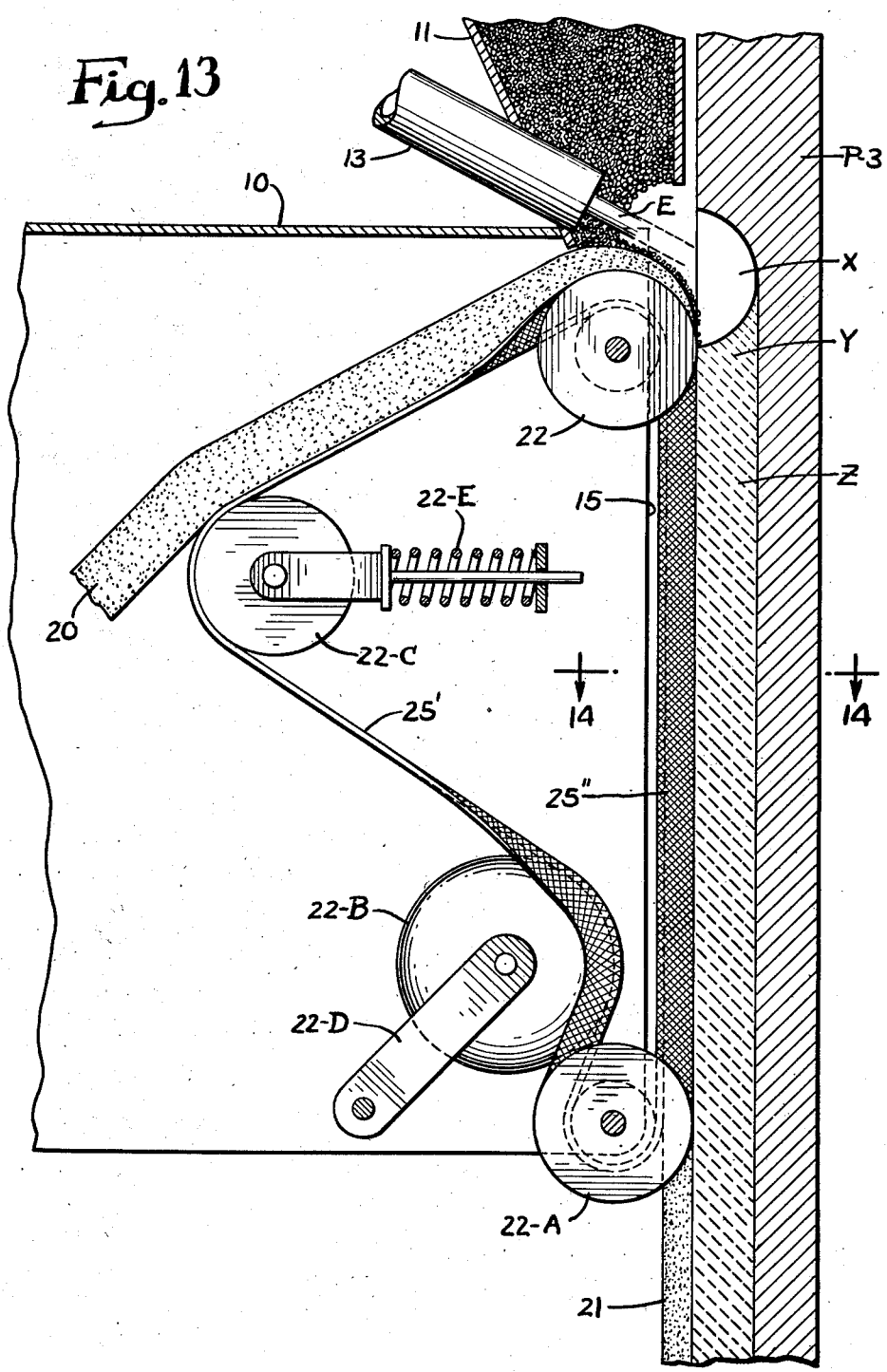

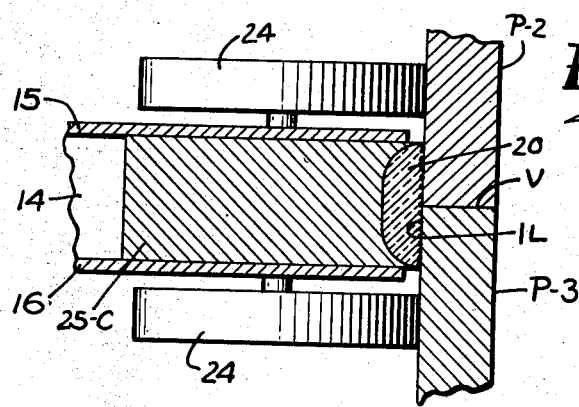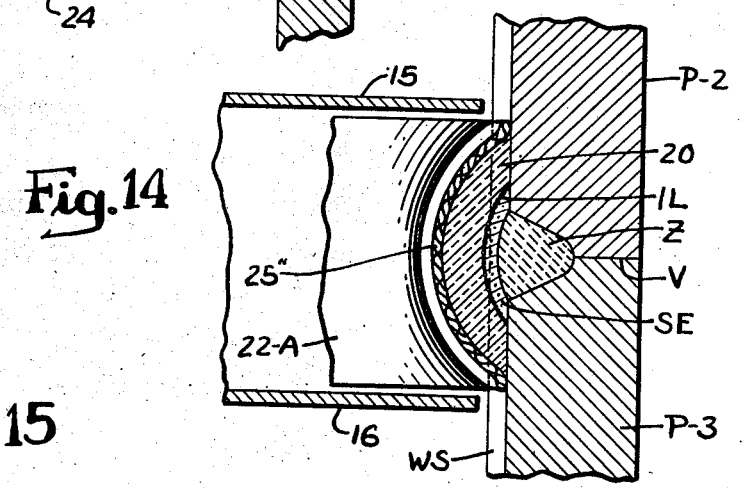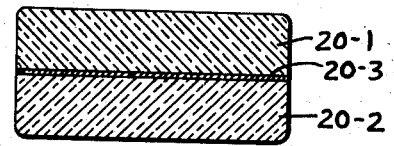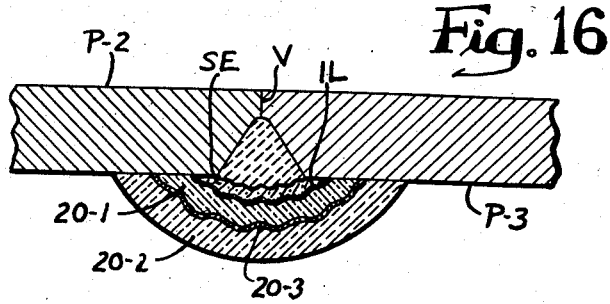

Patented Mar. 30, 1954

2,673,916

UNITED STATES PATENT OFFICE 2,673,916

WELDING PROCESS AND APPARATUS

Amel R. Meyer, Griffith, Ind., assignor to Graver Tank & Mfg. Co., Inc., East Chicago, Ind., a corporation of Delaware Application May 11, 1953, Serial No. 354,119

16 Claims. (Cl. 219—8)

This invention relates to submerged arc welding of elongated seams on work piece surfaces facing laterally or downwardly rather than upwardly. Such seams may be oriented for instance in the so called vertical or horizontal or overhead flat positions. They will be designated hereinafter as seams oriented in other than the flat downhand position.

When welding work is performed in other than the flat downhand position the molten liquid metal has a bad tendency to flow away from the welding zone due to gravity; and if submerged arc welding is used the molten liquid flux has a similar bad tendency. Unsatisfactory weld beads are produced when such flows occur.

One force is inherent in the basic welding process which tends to counteract such undesirable flows: the surface tension of the metallic melt, supplemented by the surface tension of the superimposed flux melt. Sometimes, mainly in the so called horizontal position, this force of surface tension is sufficient to prevent said undesirable flows. However this force by itself is often insufficient; that is the effective temperature, hydrostatic pressure and/or general mobility of the molten pool are often too high to allow balancing of the gravitational moment by the surface tension.

Heretofore several attempts were made to counteract or eliminate the running off of the melt. Stationary and/or movable retaining walls, so called dams, were applied for this purpose. It was also proposed to utilize the chilling effect of such and other devices and thereby to form a rapidly congealing "skin" of slag which would constitute by itself a retaining wall behind which the molten metal might cool gradually. However little or no success was obtained by such earlier attempts. I have found that this was largely due to difficulties caused by the earlier retaining walls themselves.

A main difficulty of movable dams was that in practice, their use interfered with the proper arrangement of the welding zone. It is practically impossible to avoid a certain amount of variation in the amount and distribution of solid, fluid and intermediate materials, present at successive cross sections of the welding zone. This is due to inevitable, small irregularities of welding grooves, fluctuations of heat input, and other minor changes of welding conditions. Such variations tend to be accumulated when a movable dam traverses the seam, following the arc. The accumulated variations are likely to cause occasional displacement of molten metal from the welding zone, resulting in further irregularity of arc performance. They are also likely to cause displacement or accumulation of molten flux. The net effect of these and similar irregularities is that a poor weld seam is deposited. (Theoretically these difficulties could be avoided by eliminating all local variations in the feed of filler metal and flux and in the local production of molten metal and molten flux. Practically, this would presuppose a degree of accuracy in the various control operations applied which is entirely too high to be economical. It is one of the great advantages of the conventional submerged arc process, applied in flat position, that fairly simple controls can be used and a weld of excellent quality can still be deposited. It has been one of the objects pursued by the industry to make this advantage available to welding on surfaces lying in other than flat positions.)

Difficulties were also encountered with the stationary dams, applied mainly along the sides of the seam in order to limit the spreading out of flux and melt and to provide backing up effects. Chilling effects are inherent in the use of such dams as heretofore applied, mainly when the chilling due to the base metal itself was relatively limited, as for instance in case of welding of relatively thin plates. The chilling of the welding zone due to the application of dams is well known and is even considered as an advantage in some cases; in fact it has been proposed to produce and utilize a chilling effect of a movable dam device, although this latter effect inherently must be minor. Whatever may be the exact chilling method applied, and whatever may be the exact degree of chilling obtained thereby it is important to keep in mind the fact that the practical possibilities opened by such methods are strictly limited. In numerous applications chilling is strictly undesirable, so that it should be counteracted rather than promoted, because of resulting harm to seam penetration, metallic microstructure and other related features.

I have now discovered that submerged arc welding on a work piece surface not lying in flat position can be improved in soundness, speed and other characteristics by an entirely different process and apparatus. The new process supplements the slag and flux envelope for the melt in the welding zone by a superimposed outer envelope of resiliently compressible, partly compressed, heat resistant material such as light glass wool sheeting. Such an added envelope can be pressed into firm contact with the newly deposited melt and kept in contact with the molten and congealing materials.

I have also discovered that at the same time additional modifications of known routines are desirable or even required in order to produce adequate weld joints in positions other than the flat one. Such additional modifications relate mainly to factors of heat input and heat flow, such as density and tension of welding current, size and speed of welding electrode, thermo-conductivity or insulating characteristics of the envelope strip, and sometimes additional elements of the welding routine.

The details as to such additional modifications and as to the principal melt support procedure according to the present invention will best be explained in connection with the description of a preferred welding apparatus and method in accordance with this invention. This description follows, with reference to the drawings appended hereto. It will be understood that various modifications are possible, within the scope of the claims stated at the end hereof.

In the drawing:

Figure 3 is a view similar to Figure 2 with one of the side plates of the device removed to disclose the inside.

Figures 4, 5, 6 and 7 are fragmentary sections, taken along lines shown in Figure 3 and correspondingly numbered.

Figure 12 is a section along lines 12—12 in Figure 11.

Figure 13 is a third modification of said detail and Figure 14 is a fragmentary section along lines 14—14 in Figure 13.

Figure 15 is a modification of the detail shown in Figure 4; and Figure 16 is a modification of the detail shown in Figure 7.

Figure 1:
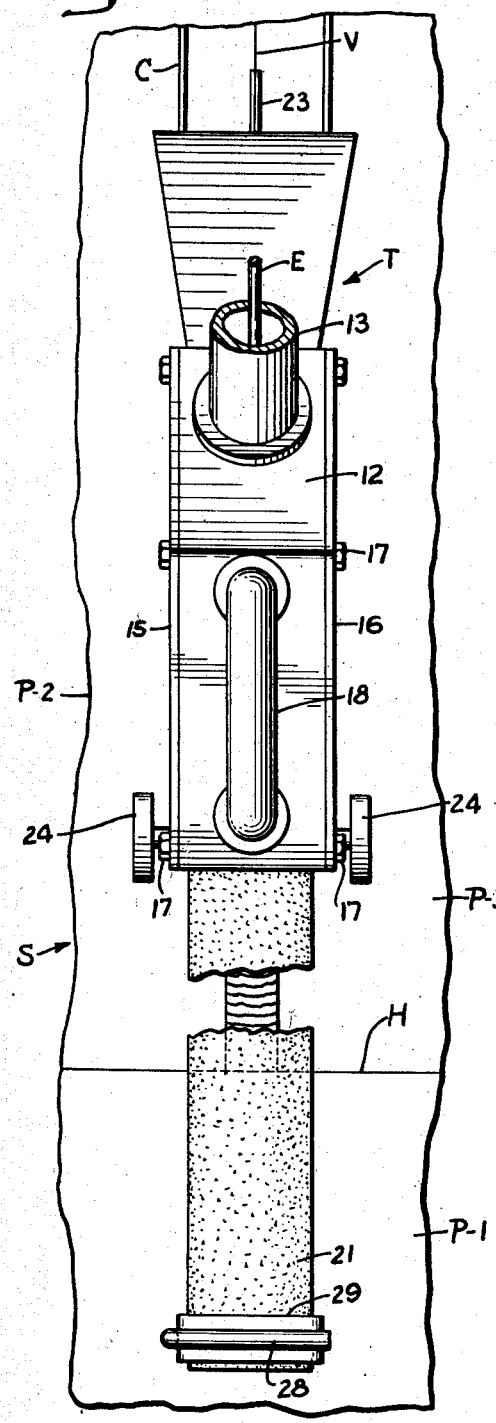
Figure 1 is a front view of apparatus in accordance herewith.
Figure 2:
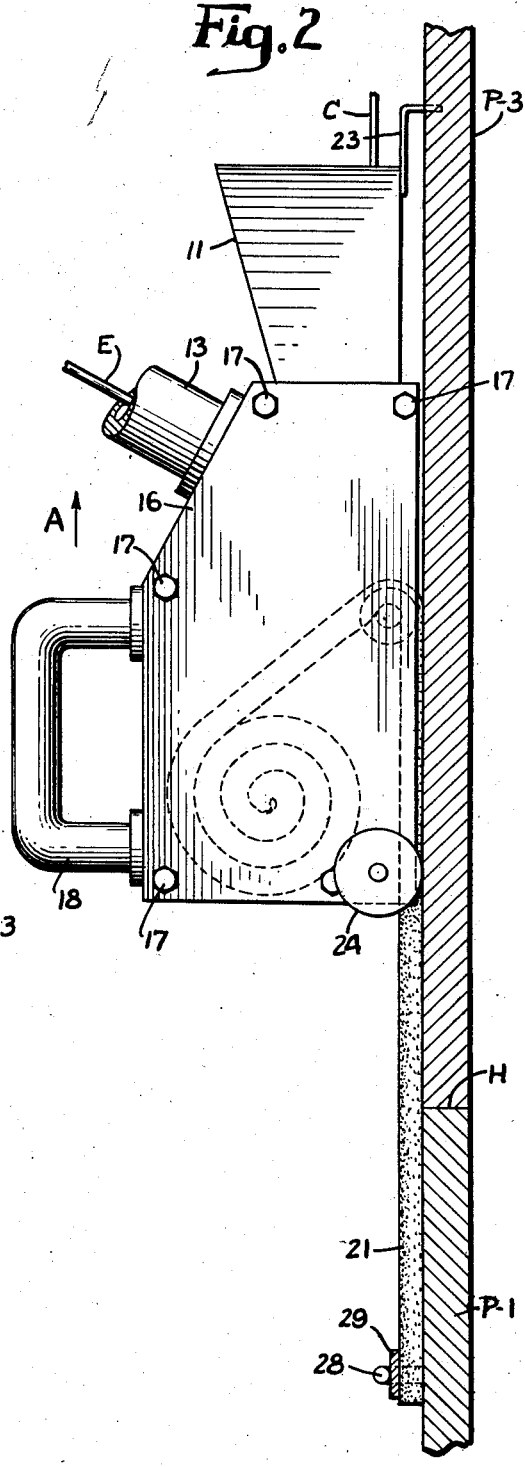
Figure 2 is a side view of the apparatus of Figure 1.

In these drawings the work piece is a shell S, composed of substantially vertical steel plates. It is assumed that a first and lower plate or set of such plates P1 has been erected and that an upper set of such plates P2, P3 has been superimposed thereon and secured thereto by horizontal seams H (made in known manner). These plates P2 and P3 are to be joined by elongated, vertical seams V.

The new welding tool for the welding of the seam V is generally identified by the letter T. It is shown in the form of a box-like device, having a top wall 10 provided with a flux receiver hopper 11; a back wall 12 provided with an electrode receiver nozzle 13 and a substantially closed bottom wall 14. It also has a pair of side walls 15 and 16, held together with the other walls by suitable bolts 17. One side of the box-like device, facing the shell plates P2 and P3 and identified as the front side is at least partly open.

The tool unit T is suspended and counterweighted from a suitable hoist (not shown) by a pair of chains or cables C. It is provided with a handle 18, secured to the back wall 12, in order to allow manual raising of the tool, along the seam V, at a predetermined rate, and lowering of the tool at the end of an upward traverse, and before the start of the next upward traverse.

A roll 19 is formed of a long and narrow strip 20 of light glass wool sheeting and is disposed within the tool or container T, resting upon the bottom wall 14. The free end 21 of this strip 20 extends over a guiding device such as a roller 22 horizontally journalled between the side walls 15 and 16 adjacent the front of the tool. The arrangement is such that the strip 20 extends from the roll 19 upward to and over the roller 22 and then downward along the plates P2, P3. The tool T has a pointer or feeler device 23 attached to the top whereby it can be kept lined up with the vertical seam V; and the roller 22 is so arranged as to keep the strip 20 similarly aligned, symmetrically with the seam V.

The vertical, plate-contacting portion of the glass wool strip or belt 20 is pressed against the seam area of the plates P2, P3 by the grooved roller 22, the flanges of which contact the plates. The lower end of the tool T is suitably spaced from the plates P2, P3 by outer rollers 24 thereon, which are manually kept in contact with the plates P2 and P3 below the inner roller 22.

The pressure applied to the glass wool strip 20 by the roller 22 is supplemented by additional pressure applied to a lower portion of the strip, below the roller 22, by a backing wall 25. This wall is rigidly secured to one or both of the side walls 15, 16. It extends from below and adjacent the roller 22 downward to the bottom 14, in a direction generally parallel with the plates P2, P3.

Above the roller 22 the wall 25 is continued upwardly by a similar wall 26, forming a back wall of the flux hopper 11. This wall 26 guides the flux to the front opening of the container 10, which opening is provided between the roller 22 and the superposed bottom end of the front wall 27 of the flux hopper.

By means of the pressure of the roller 22 and the additional pressure of the backing wall 25, the strip or belt 20 is appreciably compressed. The original configuration of the strip, in cross section is preferably rectangular as shown in Figure 4. The cross sectional area and mainly the thickness of the strip is reduced by the tensioning of the strip which is caused by the roller 22 as shown in Figure 5 at 20A. This area and thickness is further reduced by the compression of the strip between the roller 22 and the plates P2, P3 as shown in Figures 5 and 6 at 20B.

The melt-supporting process

Three different materials are directed to and forwardly through the open portion of the front of the tool T: electrode wire E, flux F and belt material 20.

Substantially all of the electrode material E is converted by the arc X into one of the metallic components of the weld zone Y and weld seam Z. Portions of flux F, slightly varying in amount, are fused into a slag envelope SE extending over and in contact with the exposed outer surface of the welding zone Y and seam Z. The belt 20 forms a superimposed envelope over this slag envelope SE. An intermediate layer IL of flux F, not fused by the arc, is interposed between the belt 20 and the fused slag SE, as best shown in Figures 14 and 16.

While the melt Z and layers SE, IL are being formed in front of the belt 20, the electrode E and the arc puddle X formed thereby are continuously traversed upward. At the same time the flux F is continuously fed downward into the arc puddle X, where sufficient portions of it are fused in order to purify the molten metal and to perform the other known functions of welding flux. The belt material 20 is continuously fed over the roller 22 toward the puddle X and top of welding zone Y, in a more or less horizontal direction, thereby intercepting the layer IL of solid flux. An upward movement, along with the electrode E, is superimposed over the downward movement of the flux and the horizontal movement of the belt. Thus the front portions of the flux are in contact with the plates P2, P3 and with the weld zone Y and are substantially stationary relative thereto. The effective movement of the belt face relative to the plates P2, P3 is upward and forward, adjacent roller 22.

The successive belt portions reaching the exposed outer surface of the slag envelope SE and welding zone Y, insulated by the flux layer IL, serve to supplement the surface tension of said envelope, thereby supporting the same, and the molten metal behind it, against the downward, gravitational displacement that would otherwise occur. The tendency toward gravitational run-off of course is directly responsive to the vertical length and total mass of the welding zone Y. However as every inch and fractional inch of that zone is contacted by the envelope materials 20 and IL, with resilient pressure directed against the plates P2, P3, this gravitational tendency is overcome. As variable amounts of entrained flux IL and fused flux SE are likely to be present at successive, superimposed locations, the resilient compressibility of the belt is important: it allows the retention of considerably varying amounts of flux and slag, without any interference with the normal deposition of the metallic melt.

The heat of the welding zone Y causes certain physical changes in the directly adjacent layers of the belt 20. These changes begin with the melting of the plastic binder whereby the fibers are bonded together; thereupon the affected portions of the strip tend to collapse; and since the heat flow in the strip tends to be irregular, such collapsing tends to be irregular and to reduce the smoothness and regularity of the belt surface. At a higher temperature the glass fiber itself begins to melt down into droplets of glass or larger particles of glass, resulting in a complete loss of resiliency in the affected portions of the belt. However these harmful effects are limited to restricted layers adjacent the hot melt surface, by the heat insulating characteristics of the flux layer IL and of the belt material itself.

Exact details in these respects are largely dependent upon the material used in or for the belt or strip 20. Particularly good effects have been obtained with light weight sheeting made from loosely felted glass wool fibers bonded together by plastic binders; such sheeting being of the type which is sometimes used as a liner for sound-deadening and being cut into strips of suitable widths, such as 1 to 2 inches. A very suitable melt retainer has been discovered in the material made and sold by the Fiber Glass Division of Libby-Owens-Ford Glass Co. under the trade name "Aircore." Pertinent properties of some of the Aircore materials can be listed as follows:

| Type No. | Weight lbs./cu. ft. | A strip of 1″ thickness is resiliently compressible to— |
| --- | --- | --- |
| 315 | ¾ | ⅛″ or less. |
| 316 | 1 | 3/16″ or less. |
| 318 | 1½ | ¼″ or less. |

In each of these types of Aircore sheeting the plastic binder begins to break down at a temperature of approximately 300° F., resulting in a loss of resiliency. In each of these types of sheeting the glass fibers melt down to droplets or irregular particles at approximately 2000° F., resulting in a loss of uniform compressibility under uniform pressures applied over an area of some extension.

The breaking down of the binder and the melting of the glass starts at a belt surface exposed to the corresponding temperature. It progresses into and through the body of the belt within a few seconds, or at very high temperatures, within a few fractional seconds, if the intense surface heat is maintained.

The actual temperature applied to the face of the glass wool strip is likely to be about 200° F. at the point where the face of the strip is heated most intensely, that is directly below the arc X. From here on the prevailing temperatures are reduced downwardly due to the inherent chilling effect of the plates P2, P3 wherein the weld is formed. Some appreciable variations of the surface temperature directly below the arc are likely to occur since the temperature of the arc itself amounts to several thousand degrees Fahrenheit, and the great reduction of such temperatures, toward the face of the glass belt, is entirely due to the insulating effects of the slag envelope SE and intercepted flux layer IL, which effects are variable. For these reasons it may be considered desirable to use an envelope strip 20 the binder of which is capable of withstanding temperatures higher than about 300° F. However up to date I have not discovered a resiliently compressible, heat-insulating material having a greater heat resistance than indicated above. What is needed is, a refractory for a small size, traveling furnace X, which refractory also provides a very specialized, resiliently deformable furnace grating. So far as I presently know the Aircore materials mentioned are most suitable for these purposes. If no resiliency were required of course a great variety of rigid refractories would be available. If no refractory characteristics were required of course it would be possible to use foam rubber, cotton and many other materials.

The actual compression applied to the envelope belt 20 by the roller 22 and backing wall 25 amounts to only a minor portion of the total possible compression; for instance a strip of Aircore material type No. 316, having an original thickness of 1 inch can advantageously be compressed to an average thickness of ⅜ inch or ¼ inch, in the area designated as 20B in Figures 5 and 6. The width of the belt front can remain approximately uniform.

The overall result of the described conditions is that (1) a substantial reserve of resiliency exists throughout the vertical extension of the envelope belt 20 along the welding zone Y; thereby avoiding the entrainment of any substantial or cumulative melt portions Y or SE, either forward, backward or laterally. At the same time (2) a positive pressure directed toward the plates P2, P3 is applied by the belt 20 through the flux and slag layers IL and SE upon the entire exposed area of molten metal Y. This positive pressure supplements the surface tension of the melt Y, SE itself, thereby allowing the orderly and undisturbed deposition of a relatively high column of melt, along the vertical seam V, which freezes into a smooth and uniform bead Z.

For instance a melt zone Y of several inches length can thus be maintained without any local downward run-off or upward displacement of melt. Such operation can be performed continuously along a vertical seam V of several feet length.

The present melt supporting process, for submerged arc welding on non-flat surfaces, is applicable whether the work piece faces laterally or downwardly. It is also applicable whether the seam extends vertically or otherwise. While in the example illustrated and described the melt envelope strip 20 is moved in a plane and direction substantially identical with the traverse of the electrode E such parallelism of movement is not essential for this process in its broadest application.

It is however essential that the fluid melt tends to run off downwardly and that accordingly the application of the melt retainer envelope must occur in a direction having at least an upward component. In order to start the operation properly the free end 21 of the envelope strip 20 must be held or attached to the structure P1 below the starting point of the seam V to be welded. In the illustrated embodiment this is done by a clip 28 and wedge 29. However a great many modifications are possible in these and other respects.

*The heat-concentrating process*

It has been proposed by Chmielewski Patent No. 2,395,723 to rapidly chill a vertical welding zone in order to utilize an enhanced "skin effect" of the slag envelope. A traveling, heat-absorbing, cooled rigid dam device, contacting the slag envelope, is proposed as a chilling means.

It may be possible to obtain some little chilling, beyond that due to the work piece itself, by such a movable object. It may also be possible thereby to produce an enhanced skin effect. However it is impossible by such procedure to produce any elongated seams of any soundness. One reason for this latter limitation is, the cumulative displacement of melt by a solid chill member traveling over the welding zone. Another reason is that the premature chilling of the melt impairs the soundness and penetration of the weld, even if a particularly high temperature is maintained in the center of the arc puddle.

Therefore, while it would be possible to replace the heat-insulating melt envelope 20 by a heat-conducting and chilling envelope consisting of metallic links or the like, the greater chilling of the welding zone obtained thereby would be a defect rather than an advantage, in a great number of welding applications. It would be prohibitive in all those cases where gas and slag entrapment must be minimized or eliminated and also in those where some appreciable weld penetration is required.

It has been proposed on the other hand to control and counteract chilling effects of backing-up plates and the like, by using a back-up or dam zone formed of refractory materials in granular form; for instance welding fluxes. This is known from the patents of Keir 2,145,009 and Bagley 2,294,439. The latter patent discloses the use of a channel wherein the granular refractory flux is held in backing-up contact with the work piece while the electrode is traversed relative to the front surface of the work piece.

In view of these patents the question may be asked whether a strip of deep granular flux and a channel for the same should not be maintained along the exposed surface of a non-flat welding zone, instead of or in addition to the glass wool strip 20 described herein.

In practice I found it impossible to produce a satisfactory seam when trying to support a relatively high column of melt by a relatively deep bed of granular flux or the like. The principal reason is that the granular material is not resiliently compressible.

In this connection it will be noted that a deep flux zone, or excess of granular flux material, is maintained around the arc X, above the roller 22, but that major portions of this flux are fused, forming the slag envelope SE, and that accordingly only a thin layer IL of granular flux is intercepted between the belt 20 and the slag envelope SE of the present method. Such a thin layer IL is satisfactory although it has no resiliency and no compressibility by itself. If it be replaced by a relatively thicker and deeper, more compressible layer of granular flux the production of acceptable weld seams ceases. The flux, exposed to the intense heat of the welding zone will then begin to shrink irregularly; and the shrinking portions are followed immediately by the liquid slag SE, which in turn is followed by the liquid metal Y, so that no seam of acceptable uniformity and smoothness is produced.

It will thus be understood that the chilling flux dam of the Chmielewski patent interferes with desirable heat flow in and around the welding puddle, while the refractory dam of the Keir and Bagley patents, when used along the front surface of a non-flat welding zone, would interfere with mechanically desirable flow conditions.

Both defects are avoided by the heat-insulating and resiliently compressible envelope strip 20 of the present method. It will further be noted that both of the important characteristics of this envelope, resilient compressibility and heat-insulating characteristics, are produced by identical or at least closely related features; particularly by the fact that the fibrous structure of the envelope material contains a large volumetric percentage of air, surrounding the fibers.

As mentioned above, considerable heat insulation is provided by the slag envelope SE and the flux layer IL as well as by the envelope strip 20. In fact the temperature gradient across the flux layer IL is particularly great. This in turn is largely due to the fact that, for proper melt supporting application, the face of the envelope strip 20 moves horizontally below the bottom of the flux supply F, directly before it contacts the weld zone Y. A materially enhanced chilling effect is produced by the so intercepted flux layer IL as compared with the substantially stationary flux present in the conventional flat welding routine.

Figure 8:
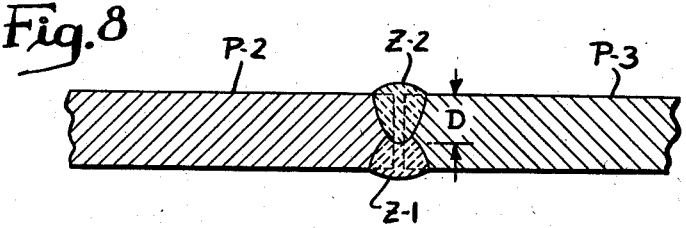
Figure 8 is a view generally similar to Figure 7 but showing the weld seam completed.

For this reason the heat flow conditions in accordance with the present method differ from those prevailing in normal flat welding, when other things are equal. This will best be explained by reference to Figure 8.

That figure shows a weld seam composed of a first bead Z1 and a second bead Z2, joining two relatively thin, square-edged plates P2, P3 in butt joint position. The penetration D of each bead is slightly more than one-half the plate thickness. Considering first, the most economical routine for welding in flat position, and assuming that the plates have a thickness of approximately ⅜ inch, it is usual first to deposit the bead Z1, facing upward, by an electrode of approximately $\frac{3}{16}$ inch diameter, travelling at a speed such as approximately 24 inches per minute. Different current densities and tensions can be used, depending on whether the bead is desired to be relatively flat and smooth or relatively narrow with pronounced reinforcement; the total heat input per foot of bead can be approximately the same in both cases. The routine followed for the flat deposition of the second bead Z2, after reversal of the plates P2, P3, can be generally similar.

In order to produce a substantially similar seam in vertical position, in the most economical and efficient manner, it is vastly preferable to utilize much thinner electrodes and much slower speeds, while keeping the total heat input per foot of bead approximately similar or possibly somewhat lower; both beads being preferably produced in a substantially simultaneous operation although the first bead can be deposited by a slightly leading electrode. For instance I have found electrodes of $\frac{3}{32}$ inch size and a traveling speed such as 16 inches per minute adequate for this purpose. Some melt retaining procedure is also required due to the height of the liquid metal column in the vertical weld seam.

By means of the smaller size and lower speed of the electrodes the heat provided is concentrated, as compared with the conventional flat routine, thereby counteracting the inherent chilling of the welding zone by the entrained flux IL.

Figure 9:
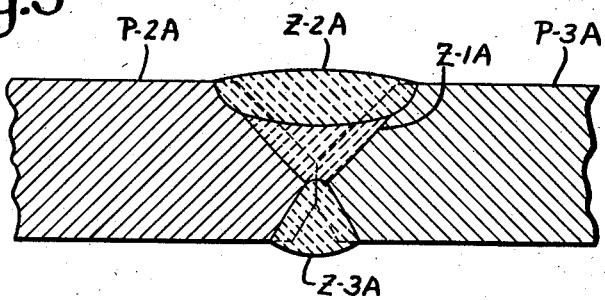
Figure 9 is a modification of Figure 8, showing a completed weld seam formed in thicker plate material.

Such heat concentration is also necessary in the welding of thicker plates as illustrated in Figure 9. Here the plates P2A and P3A may have a thickness of ½ inch. Flat welding will then be produced preferably with two substantially uniform beads, deposited in two substantially uniform, beveled grooves, by means of electrodes of approximately $\frac{3}{16}$ inch size. Two passes are made at about 18 inches per minute each.

The vertical routine in this case may preferably use two consecutive passes also. However it is again preferred to use much thinner electrodes, such as $\frac{3}{32}$ inch size, and accordingly to deposit first a bead Z1A at the bottom of a relatively large groove on one side of the plates; following then by the substantially simultaneous deposition of two mutually opposed beads Z2A, Z3A as shown. The traveling speed during the first pass is preferably about 15 inches per minute; during the second pass it may be slightly more rapid.

It will thus be seen that the new welding routine for use in other than flat downhand position requires and allows the use of unusually small electrodes, traversing at an unusually slow speed, with more or less usual heat input. Typically, the electrode diameter is about one-half of that for comparable welding in flat downhand position. The traversing speed is typically about 60% to 90% of that for comparable welding in flat downhand position.

Modified structures

Figure 10:
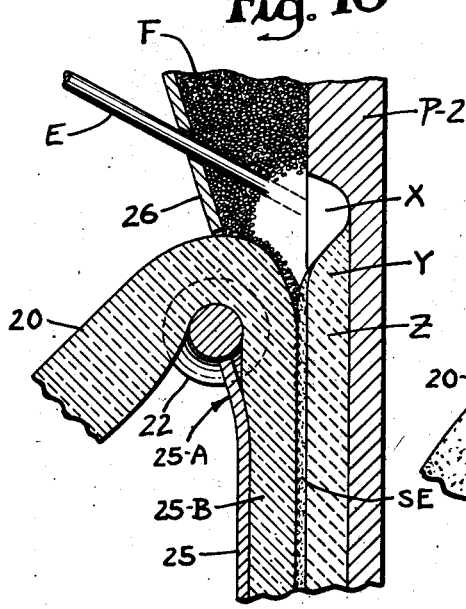
Figure 10 is a first modification of a detail shown in Figure 3.

It is sometimes preferable to form the backing wall 25 in a manner approximately as shown in Figure 10, wherein this wall has an upper portion 25A, directly below the belt roller 22, which portion is inclined downwardly toward the plates P2, P3 in order to obtain progressive restriction of the downward channel 25B for the strip 20.

Such restriction will compensate for a certain progressive shrinkage of the strip 20, which occurs upon the heating of the strip, even before the binder breaks down. Without such compensation, diminishing pressure may occur, in downward progression along the welding zone Y. While a certain reserve of resilient compressibility and pressure should and can be maintained in any event as noted above, this is sometimes facilitated by counteracting the shrinkage of the strip in the manner as shown.

Figure 11:
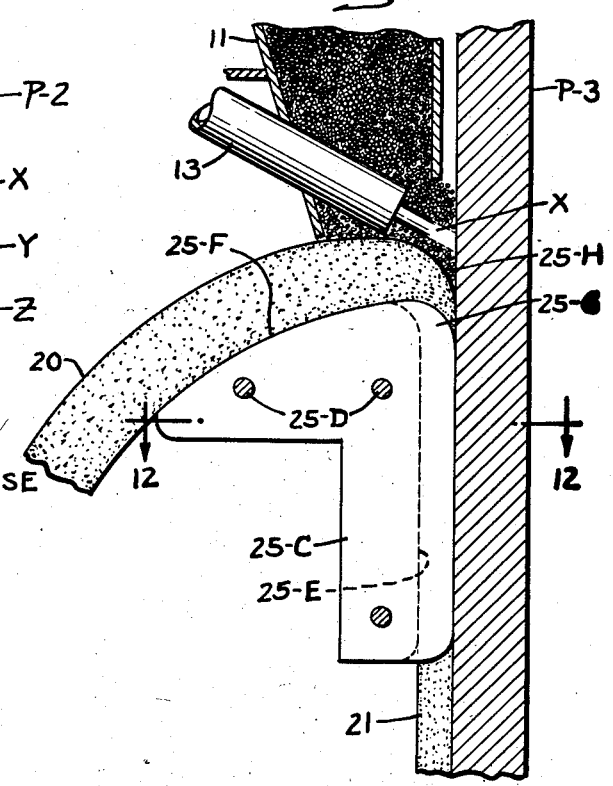
Figure 11 is a second modification of said detail.

A second modification of the backing wall 25 is shown in Figures 11 and 12. Here the backing up of the strip 20 is performed by a block 25C, shown as rigidly secured to one or both of the side walls 15, 16 by bolts 25D, and having a vertically grooved face portion 25E in addition to a flat table portion 25F. This latter portion extends in a flat plane and merges gradually with the grooved portion 25E, in a transition portion 25G at the front of the device. The strip 20 is loosely supported on the table portion 25F and is guided into the grooved portion 25E by the transition portion 25G.

Such guiding of the strip 20 is gradual, by means of a smoothly rounded contour of the transition portion 25G. However the radii of curvature of the surface of the transition portion 25G are short, so that all of the gradual guiding of the strip 20 occurs within an area having a short forward extension, below and in front of the electrode nozzle 13. The arrangement is such that all of the flux which can be entrained to form the layer IL contacts the face of the belt 20 in this limited area; in other words a relatively small flux hopper zone 25H is formed between the plates P2, P3 and the forwardly-downwardly extending, flux-contacting face portion of the belt 20. In this manner a desirably thin layer IL of flux is entrained, which also has correspondingly small variation of thickness, relative to the thickness of the envelope belt 20.

A third modification of the backing wall for the belt 20 is shown in Figures 13 and 14. Here a straight, taut, vertical run 25″ of a flexible endless carrier belt 25′ is used. This belt is trained over a pair of grooved rollers 22, 22A superposed above one another and pivoted between the side plates 15, 16. Both rollers contact the plates P2, P3 with the outermost edges of their flanges. The rollers 24 can be omitted in this design. It is also possible to replace the upper roller 22 by a block 25C as shown in Figures 11 and 12.

In order to transmit the rotation of the grooved roller 22A to the carrier belt 25′ without slippage, and thereby to hold the operating run 25″ of that belt, and the compressible belt 20, temporarily stationary along the plates P2, P3, a pressure roller 22B is provided to hold the belt 25′ in firm contact with the lower grooved roller 22A. Preferably the pressure roller 22B engages the two flanges of the lower grooved roller 22A. The pressure roller 22B has a more or less cylindrical outer surface, in order to shape the return run of the carrier belt 25′ into a flat form as shown. The belt 25′ can then be trained over a cylindrical return roller 22C, which may be spring loaded by a conventional take-up device 22E in order to maintain a predetermined degree of tension in the carrier belt.

The device of Figures 13 and 14 allows the use of a particularly well compressible, light weight contact material in the refractory belt 20. Such material might otherwise lead to difficulties because of disintegration of the loosely felted belt due to sliding friction in a channel 25, 25B or 25E.

Another advantage of the device of Figures 13 and 14 is that it allows smooth operation even in the presence of substantial irregularities in the work piece surface WS. As shown in Figure 14 this surface may not be strictly vertical and straight. Nevertheless irregularity of flux interception and other operating features is avoided. If the surface WS has a bulge projecting toward the tool T, between the rollers 22, 22A, the belts 20 and 25" are allowed by the resiliency of the take-up mechanism 22E to shape themselves accordingly. If the working surface WS has a bulge facing in the opposite direction, the resilient compressibility of the belt 20 keeps the face of that belt in firm contact with the plates, while the carrier belt 25" forms a chord across this bulge. When both of these adjustments have to be provided by the compressible nature of the belt 20, an expendable belt 20 of substantial thickness is required. The endless, non-expendable carrier belt 25' allows a saving and operating improvement in this respect.

Finally a modification of the compressible, expendable melt retainer belt is shown in Figures 15 and 16. Here the retainer belt comprises two co-extensive portions 20-1 and 20-2, which may be formed of materials similar to those used in the strip 20, and which are separated by and bonded to a sheet 20-3 of aluminum foil or the like, throughout their length and width. The front layer 20-1 of glass wool or the like absorbs practically all of the intense heat emanated by the welding zone, since the separating sheet 20-3 of aluminum foil or the like reflects any intense heat that would otherwise penetrate into the back-up layer 20-2. Thus the back-up layer 20-2 is protected from over-heating, shrinking, breakdown of binder, and loss of resiliency. The front layer 20-1, which desirably may be thinner than the back layer 20-2, shapes itself according to any and all local irregularities of the melt deposit, incident to which it may even break down in part or in full, at some locally overheated portions. Uniform resilient pressure is neverthless applied by the protected back-up layer 20-2.

At the same time the aluminum strip 20-3 also provides longitudinal reinforcement for the entire envelope belt, safely protecting it from harm due to the gradual unwinding of a roll 19 or the like.

Various other modifications are possible.

I claim:

1. In a welding process for use on a work piece surface oriented in other than the flat downhand position, the steps of traversing the surface with a flux submerged arc; and supporting the resulting melt by pressing a resiliently compressible, heat-resistant, heat-insulating body against the exposed face of the melt so as to partly compress the body.

2. In a welding process for use on a work piece surface oriented in other than the flat downhand position, the steps of traversing the surface with a flux submerged arc; and supporting the resulting melt by pressing a strip substantially formed of loosely felted, mutually bonded fibers of refractory material against the exposed face of the melt so as to partly compress the strip.

3. A process as described in claim 2 wherein said strip comprises a plurality of layers of said loosely felted fibers.

4. A process as described in claim 3 wherein such layers are separated by and bonded to a strip of sheet material such as aluminum foil.

5. In a welding process for use on a work surface oriented in other than the flat downhand position, the steps of traversing the surface with a flux submerged arc; and supporting the resulting melt by pressing a strip, resiliently compressible over a substantial part of its original thickness, said strip being heat-resistant, heat-insulating and formed of glass material, into temporarily stationary contact with the exposed face of the melt, so as to partly compress the strip.

6. In a process as described in claim 5 the additional step of moving successive portions of the strip toward the work piece surface while contacting them with flux for the flux submerged arc, whereby a layer of such flux is intercepted between the melt and the strip.

7. A process as described in claim 6 wherein the contact between the successive portions of the strip and the flux is limited to an area having a short forward extension and lying directly below the arc, whereby the thickness of the intercepted layer of flux is limited.

8. In a welding process for use on a work piece surface oriented in other than the flat downhand position, the steps of traversing the surface with a flux submerged electrode tip the diameter of which is substantially smaller than that of an electrode tip for comparable welding in flat downhand position; the traversing speed being slow as compared with that used in comparable flat downhand welding and the total heat input being approximately the same as in comparable flat downhand welding; and supporting the exposed face of the resulting melt by a heat-insulating strip.

9. A process as described in claim 8 wherein the heat-insulating strip substantially consists of resiliently compressible solid material and is partly compressed when supporting the melt.

10. A process as described in claim 9 wherein said strip comprises at least two co-extensive layers of the resiliently compressible material, and an interposed, heat-reflecting layer.

11. A process as described in claim 8 wherein the diameter of the electrode tip is approximately half the size of an electrode tip for comparable flat downhand welding; the traversing speed being about 60 to 90% of that for such comparable welding.

12. Welding apparatus for use on a work piece surface oriented in other than the flat downhand position, comprising means to traverse the surface with a flux submerged arc; a strip of resiliently compressible, heat-resistant, heat-insulating solid material; and means to press successive portions of the strip against the exposed face of the melt resulting from the arc so as to partly compress the strip.

13. Apparatus as described in claim 12 wherein the means to press the strip against the melt comprises a guide structure so arranged that the belt moving over the same and being partly compressed contacts a relatively small bottom area of the flux for the flux submerged arc, directly below said arc.

14. Apparatus as described in claim 12 wherein the means to press the strip against the melt provides a downwardly converging channel for the strip.

15. Welding apparatus for use on a work piece surface not lying in flat position comprising means for traversing the surface with a flux submerged arc; a strip of resiliently compressible, heat-resistant, heat-insulating solid material for partial compression against the melt; a carrier belt for said strip; and means to guide the carrier belt along the welding zone of the flux submerged arc and thereby to guide successive portions of the strip into contact with the melt.

16. Apparatus as described in claim 15 wherein the means to guide the carrier belt comprises at least one roller adapted to be and remain in contact with the work piece surface laterally of the arc, and means to transmit the rotation of said roller to the carrier belt substantially without slippage.

AMEL R. MEYER.

References Cited in the file of this patent

UNITED STATES PATENTS

| Number | Name | Date |
|---|---|---|
| 1,978,317 | Miller | Oct. 23, 1934 |
| 2,294,439 | Bagley | Sept. 1, 1942 |
| 2,331,937 | Schreiner | Oct. 19, 1943 |
| 2,347,914 | Kricker | May 2, 1944 |
| 2,362,505 | Smith | Nov. 14, 1944 |
| 2,395,723 | Chmielewski | Feb. 26, 1946 |

OTHER REFERENCES

"Procedure Handbook of Arc Welding Design and Practice," Lincoln Elec. Co., 1933, p. 54. (Copy in Division 37.)